United States Patent [19]

Old et al.

[11] Patent Number: 4,811,620

[45] Date of Patent: Mar. 14, 1989

[54] THROTTLE CONTROLS

[75] Inventors: John L. Old, Kenilworth, England; Harry Summers, Coventry, United Kingdom

[73] Assignee: Massey-Ferguson Services N.V., Curacao, Netherlands Antilles

[21] Appl. No.: 59,350

[22] Filed: Jun. 8, 1987

[30] Foreign Application Priority Data

Jun. 7, 1986 [GB] United Kingdom ............... 8613915

[51] Int. Cl.$^4$ ..................... G05G 9/00; G05G 13/00; F16C 1/10

[52] U.S. Cl. .................................... 74/474; 74/471 R; 74/471 XY; 74/480 R; 74/501.6; 188/24.16

[58] Field of Search .............. 74/501.5 R, 502, 471 R, 74/471 XY, 473 R, 474, 478, 480, 491, 500.5, 502.1, 502.6, 502.4; 188/24.16

[56] References Cited

U.S. PATENT DOCUMENTS

| | | | |
|---|---|---|---|
| 2,539,589 | 1/1951 | Pacas | 74/474 |
| 3,187,603 | 6/1965 | Haddad | 74/501 R |
| 3,942,609 | 3/1976 | Hill | 188/24.16 |
| 4,040,306 | 8/1977 | Jensen | 74/474 |
| 4,045,666 | 8/1977 | Stringer | 74/501 R |
| 4,057,127 | 11/1977 | Woodring | 188/24.16 |
| 4,271,918 | 6/1981 | Molby | 74/474 |
| 4,480,720 | 11/1984 | Shimano | 74/471 R |
| 4,524,632 | 6/1985 | Ballard | 74/471 R |
| 4,553,446 | 11/1985 | Matsubara | 74/471 R |
| 4,630,500 | 12/1986 | Suzuki | 74/471 XY |
| 4,691,584 | 9/1987 | Takaishi et al. | 74/501 R |
| 4,693,437 | 9/1987 | Khachikian | 74/480 R |

FOREIGN PATENT DOCUMENTS 620334 3/1949 United Kingdom ................. 74/480

Primary Examiner—Richard E. Moore
Assistant Examiner—Vinh Luong

[57] ABSTRACT

A combined hand and foot control for a prime mover throttle member 10 including a hand control 12, a foot control 13, and a combining device 14 for combining the hand and foot controls. The combining device includes a plastics support housing 14a,14b and a combining member 34 slidable within the housing in first and second opposite directions. A first cable linkage 17 connects the combining member 34 with the throttle member 10 so that movement of the combining member in the first direction moves the throttle member towards a fully open position. A spring 38 act to bias the throttle member towards an idle position and hence bias the said combining member 34 in the second direction via the first cable linkage 17. a second cable linkage 16 connects the foot control 13 and combining member 34 for movement of the combining member in the first direction, and a third cable linkage 15 connects the hand control 12 with the combining member 34 via a connection 15c,35a capable of moving the combining member in the first direction only and allowing sliding of the combining member in the first and second directions relative to the third linkage 15. The arrangement is such that any throttle member position set by the hand control 12 can be increased using the foot control 13 by the second linkage 16 sliding the combining member 34 in the first direction relative to the third linkage 15.

6 Claims, 2 Drawing Sheets

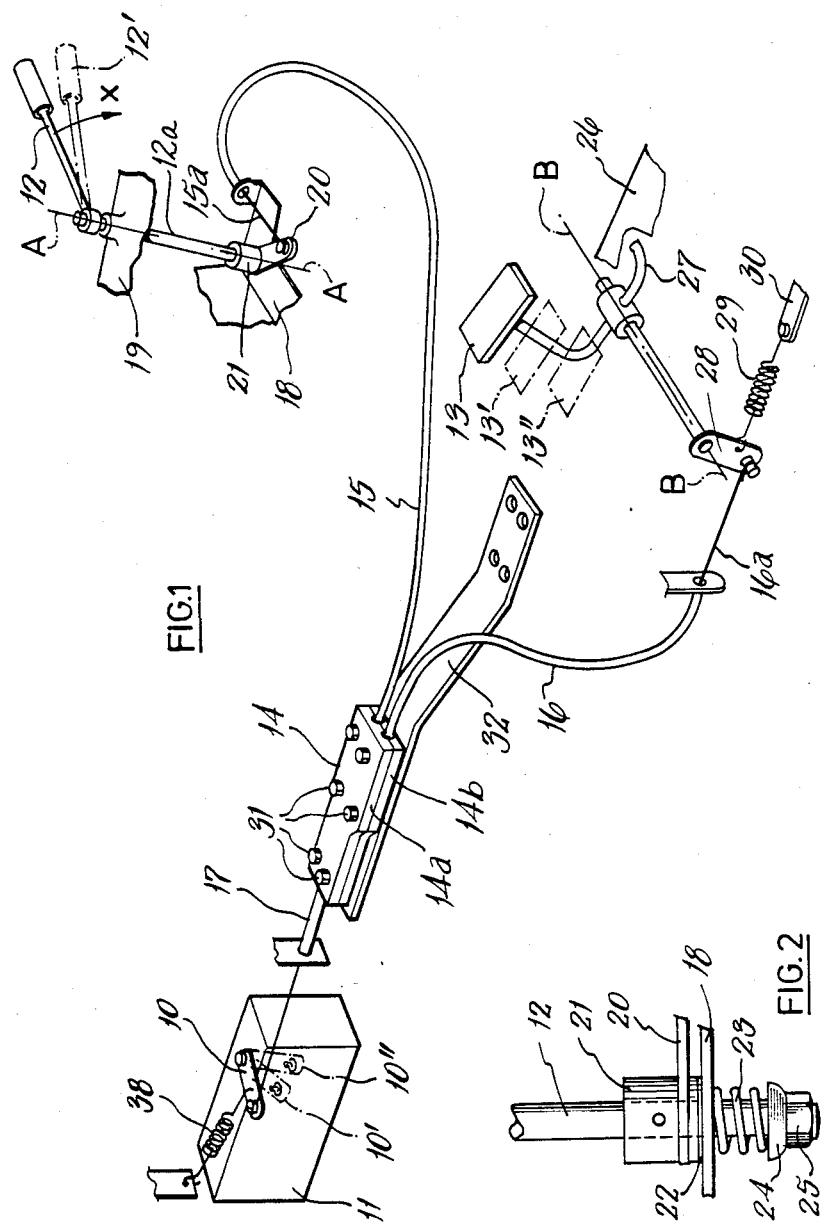

THROTTLE CONTROLS

This invention relates to throttle controls and in particular to combined hand and foot controls which allow the position of a throttle member of a prime mover to be adjusted by both an operator's hand and foot.

Such combined hand and foot controls are common on agricultural tractors to adjust the position of a throttle lever on a diesel engine fuel injection pump but are frequently relatively complex in construction and because of a tendency to use rigid links often require to be tailored for each particular tractor in a given tractor manufacturers range.

It is an object of the present invention to provide an improved combined hand and foot control for a throttle member which is suitable for use on a tractor diesel engine and which mitigates the above problems.

Thus according to the present invention there is provided a combined hand and foot control for a prime mover throttle member comprising a hand control, a foot control, a combining device including a support member and a combining member slidable relative to the suppport member in first and second opposite directions, first linkage means connecting the combining member with the throttle member so that movement of the combining member in said first direction moves the throttle member towards a fully open position, bias means acting to bias the throttle member towards an idle position and hence bias said combining member in said second direction via the first linkage means , second linkage means connecting the foot control and combining member for movement of the combining member in said first direction, and third linkage means connecting the hand control with the combining member via a connection capable of moving the combining member ins aid first direction only and allowing sliding of the combining member in said first and second directions relative to the third linkage means, the arrangement being such that any throttle member position set by the hand control can be increased using the foot control by said second linkage means sliding the combining member in said first direction relative to said third linkage means.

Preferably each linkage means includes a Bowden cable to permit easy installation of the control on a tractor.

The support member may conveniently comprise a housing within which a combining member in the form of slidable block is supported.

When employing linkage means including a Bowden cable the outer of each cable may be held captive by the housing and the inner of each cable connected with the slidable block.

Conveniently the slidable block may be provided with three slots which extend end to end of the block in directions parallel to said first and second directions, each slot being arranged to receive a respective Bowden cable inner loosely slidable therein and each inner being connected with the block by abutment of a nipple thereon with a respective end face of the block to transmit motion to the block by tension of the inner.

One embodiment of the present invention will now be described, by way of example only, with reference to the accompanying drawings in which:

FIG. 1 is a diagrammatic perspective view (not to scale) of a combined hand and foot control for the control of a throttle lever on a diesel engine fuel injection pump;

FIG. 2 shows part of the hand control of FIG. 1 in more detail;

Figure 3:
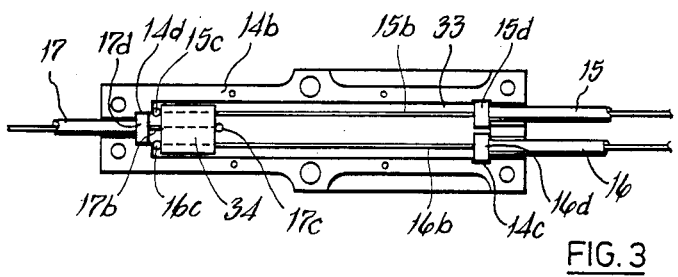
FIGS. 3 and 4 show parts of a combining device which forms part of the control arrangement of FIG. 1, and FIGS. 5 and 6 show the combining device in different states.

Referring to FIG. 1 this shows a combined hand and foot control arrangement for a throttle member in the form of a throttle lever 10 of the tractor diesel engine fuel injection pump 11. The control arrangement includes a hand control lever 12 and a throttle pedal 13 which are both connected with a combining device 14 via Bowden cables 15 and 16 respectively. The combining device is in turn itself connected by a further Bowden cable 17 with the throttle lever 10.

The hand control lever 12 is supported on a shaft 12a for pivotting about an axis A—A by a lower bracket 18 and an upper bearing support 19 provided as part of the vehicle instrument panel. The end 15a of the inner of Bowden cable 15 is connected with an arm 20 which is supported from a boss 21 on the lower end of shaft 12a. As is conventional with such hand controls a friction device is provided to hold the hand lever in the position set by the tractor operator. This can conveniently be provided by the arrangement shown in FIG. 2 in which friction material 22 on the bottom of boss 21 is clamped against support bracket 18 by a compression spring 23 which is held captive on the lower end of shaft 12a by a washer 24 and nut 25.

The throttle pedal 13 is mounted for pivotting about an axis B—B just below the tractor cab floor or footstep, part of which is shown at 26. The pedal is provided with a stop 27 which abuts the underside of floor 26 to limit the downward movement of pedal 13. The end 16a of the inner of Bowden cable 16 is connected with pedal 13 via an arm 28 and a spring 29 acts between the arm 28 and a fixed point 30 on the tractor to maintain the Bowden cable end 16a tensioned and also to prevent vibration of the throttle pedal arrangement.

Figure 4:
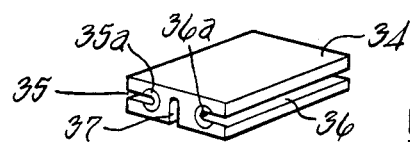

The combining device 14 comprises two housing halves 14a and 14b of plastics material which are bolted together at 31. These bolts 31 also serve to secure the combining device to a support bracket 32 which is mounted on any convenient part of the tractor. FIG. 3 shows the internal details of the combining device with the upper part 14a removed. Within the two housing halves a channel 33 is defined in which a combining member 34 in the form of a plastics block is slidable. This block is shown in greater detail in FIG. 4. The block includes three longitudinally extending slots 35, 36 and 37 which are arranged to receive the ends 15b, 16b, 17b of the inners Bowden cables 15 16 and 17 respectively.

As can be seen from FIG. 3 the nipples 15c and 16c of cables 15 and 16 are partially recieved in recesses 35a and 36a provided in block 34. Similarly the nipple 17c of cable 17 is received in a corresponding recess in the opposite end of block 34. The outers of cables 15, 16 and 17 are held captive within the housing halves by engagement of end ferrules 15d, 16d and 17d in recesses 14c and 14d in the housing halves.

FIG. 3 shows the combining member 34 in its minimum or idling speed position corresponding to the position of the hand control 12 and pedal 13 of FIG. 1. In this position the throttle lever is biased by spring 38 into its closed or idle position shown in FIG. 1.

Figure 5:
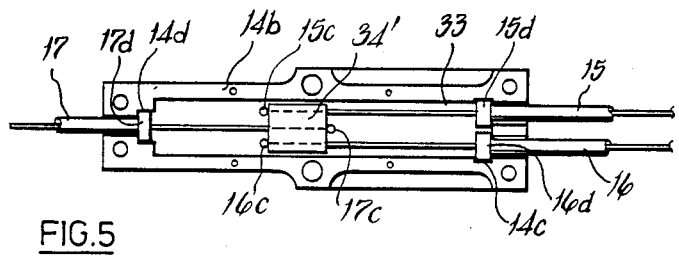

If we now assume that the tractor operator moves the hand lever 12 in the direction X of FIG. 1 to position 12' this will increase the engine speed by drawing the inner of cable 15 to the right as viewed in FIG. 5 to draw the block 34 to the position 34' shown in FIG. 5. This in turn draws the inner of cable 17 to the right thus pivoting the throttle lever 10 to the dotted line position 10' shown in FIG. 1. Because of the action of spring 29 the inner of cable 16 is also drawn to the right so that the nipple 16c maintains contact with the recess 36a as shown in FIG. 5 and the pedal 13 thus pivots to the depressed position 13'.

Figure 6:
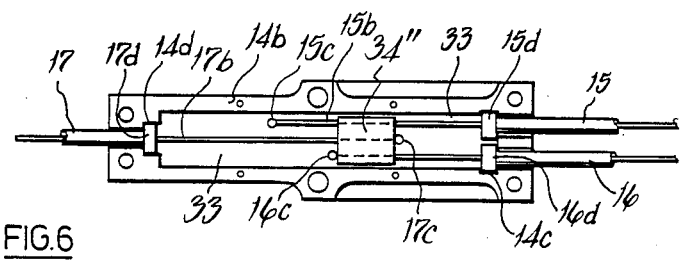

If the operator now decides to override set the throttle lever position 10' by further depressing the pedal to the position 13" this will draw the inner of cable 16 to the right, as viewed in FIG. 6, thus drawing the block 34 to position 34" and pivoting the throttle lever to position 10" via cable 17. As can be seen from FIG. 6, when the block moves to position 34" the end 15b of the inner of cable 15 does not move since the hand control 12 is held stationary by the friction device associated with the hand control. Thus block 34 slides relative the calbe end 15b.

If the operator then lifts his foot from pedal 13, the pedal will rise to position 13' and the block will return to position 34' under the action of spring 38 which also returns the throttle lever to position 10', thus returning the throttle lever to the position set by the hand lever 12.

As will be appreciated the present invention therefore provides a simple, low cost and efficient arrangement for combining hand and foot throttle controls which, due to its use of flexible Bowden cables, is particularly easy to install on a variety of different machines, since the cables can easily be routed to the throttle lever from the hand and foot controls by the most convenient route.

We claim:

1. A throttle control for a prime mover comprising a prime mover throttle member, a hand control, a foot control, a combining device including a support member and a combining member slidable relative to the support member in first and second opposite directions, first linkage means connecting the combining member with the throttle member so that movement of the combining member in said first direction moves the throttle member towards a fully open position, bias means acting to bias the throttle member towards an idle position and hence bias said combining member in said second direction via the first linkage means, second linkage means connecting the foot control and combining member for movement of the combining member in said first direction, and third linkage means connecting the hand control with the combining member via a connection capable of moving the combining member in said first direction only and allowing sliding of the combining member in said first and second directions relative to the third linkage means, the arrangement being such that any throttle member position set by hand control can be increased using the foot control by said second linkage means sliding the combining member in said first direction relative to said third linakge means.

2. A control according to claim 1 in which the support member comprises a housing within which the combining member in the form of a slidable block is supported.

3. A control according to claim 2 in which the housing and slidable block are made from plastics material.

4. A control according to claim 1 in which each linkage means includes a Bowden cable to permit easy installation of the control.

5. A control according to claim 4 in which the support member comprises a housing within which the combining member in the form of a slidable block is supported and in which the outer of each cable is held captive by the housing and the inner of each cable is connected with the slidable block.

6. A control according to claim 5 in which the slidable block is provided with three slots which extend end to end of the block in directions parallel to said first and second directions, each slot being arranged to receive a respective Bowden cable inner loosely slidable therein and each inner being connected with the block by abutment of a nipple thereon with a respective end face of the block to transmit motion to the block by tension of the inner.

* * * * *